(12) United States Patent
Ferrari et al.

(10) Patent No.: US 11,770,998 B2
(45) Date of Patent: Oct. 3, 2023

(54) SEEDING ASSEMBLY FOR SEEDING MACHINE

(71) Applicants: INSTITUTO NACIONAL DE TECNOLOGÍA AGROPECUARIA, Ciudad Autónoma de Buenos Aires (AR); PLA S.A., Provincia de Santa Fe (AR)

(72) Inventors: Hernan Javier Ferrari, Concepción del Uruguay (AR); Luis Duranti, Provincia de Santa Fe (AR)

(73) Assignees: INSTITUTO NACIONAL DE TECNOLOGIA AGROPECUARIA, Ciudad Autonoma de Buenos Aires (AR); PLA S.A., Provincia de Santa Fe (AR)

( * ) Notice: Subject to any disclaimer, the term of this patent is extended or adjusted under 35 U.S.C. 154(b) by 388 days.

(21) Appl. No.: 16/705,651

(22) Filed: Dec. 6, 2019

(65) Prior Publication Data

US 2020/0178453 A1 Jun. 11, 2020

Related U.S. Application Data

(60) Provisional application No. 62/776,933, filed on Dec. 7, 2018.

(51) Int. Cl.
*A01C 7/20* (2006.01)
*A01C 5/06* (2006.01)

(52) U.S. Cl.
CPC .............. *A01C 7/201* (2013.01); *A01C 5/064* (2013.01); *A01C 5/066* (2013.01); *A01C 7/203* (2013.01); *A01C 7/205* (2013.01)

(58) Field of Classification Search
CPC ........... A01C 5/06; A01C 5/064; A01C 5/066; A01C 5/068; A01C 7/006; A01C 7/04;
(Continued)

(56) References Cited

U.S. PATENT DOCUMENTS

| 4,078,504 A | 3/1978 | Tye |
| 4,116,140 A * | 9/1978 | Anderson .............. A01C 7/203 |
| | | 111/139 |

(Continued)

FOREIGN PATENT DOCUMENTS

| CA | 3019777 A1 * | 4/2020 |
| CN | 101278627 A | 10/2008 |

(Continued)

OTHER PUBLICATIONS

Metal Supermarkets, "Top Steel Tubing Applications", Jul. 6, 2015 (Year: 2015).*

(Continued)

*Primary Examiner* — Alicia Torres
(74) *Attorney, Agent, or Firm* — Muncy, Geissler, Olds & Lowe, P.C.

(57) ABSTRACT

A seed-sowing assembly, especially of rice, consisting of at least two single seeding units arranged in parallel and displaced longitudinally from each other, which allows a narrow separation between furrows, wherein each of said single units comprises a first pivoting support arm connected at one of its ends that supports a load regulator; and a second pivoting support arm connected to another end of the first support arm that supports at least one furrow-generating disc; at least one depth limiting wheel coupled to at least one furrow-generating disc; a seed contact wheel; and a third pivoting support arm connected to one end of the second support arm that supports two furrow-closing wheels. A seed-sowing machine comprising the seed-sowing assembly.

23 Claims, 6 Drawing Sheets

(58) Field of Classification Search
CPC .... A01C 7/06; A01C 7/08; A01C 7/12; A01C 7/20; A01C 7/203; A01C 7/201; A01C 7/205
See application file for complete search history.

(56) References Cited

U.S. PATENT DOCUMENTS

| | | | | |
|---|---|---|---|---|
| 4,273,057 | A * | 6/1981 | Pollard | A01C 7/203 111/136 |
| 4,515,291 | A * | 5/1985 | Holmes | A01C 7/046 221/277 |
| 4,528,920 | A | 7/1985 | Neumeyer | |
| 4,598,654 | A * | 7/1986 | Robertson | A01C 7/201 111/165 |
| 4,733,730 | A * | 3/1988 | Murray | A01C 5/068 111/135 |
| 4,986,200 | A * | 1/1991 | Johnston | A01C 5/064 111/121 |
| 5,802,995 | A * | 9/1998 | Baugher | A01C 5/068 111/140 |
| 5,934,208 | A | 8/1999 | Clemons | |
| 6,314,897 | B1 * | 11/2001 | Hagny | A01C 7/006 111/192 |
| 8,789,481 | B2 * | 7/2014 | Castagno | A01C 7/203 111/926 |
| 9,345,187 | B2 * | 5/2016 | Laake, Jr. | A01B 49/027 |
| 9,565,798 | B2 * | 2/2017 | Baker | G01F 1/661 |
| 9,943,030 | B2 * | 4/2018 | Sheppard | A01C 7/205 |
| 2008/0302283 | A1 * | 12/2008 | Martin | A01C 7/006 111/52 |
| 2011/0139051 | A1 | 6/2011 | Moszoro | |
| 2012/0012042 | A1 | 1/2012 | Castagno | |
| 2013/0206431 | A1 * | 8/2013 | Freed | A01C 5/064 172/1 |
| 2014/0216771 | A1 * | 8/2014 | Bassett | A01B 49/027 172/150 |
| 2018/0042171 | A1 * | 2/2018 | Maro | A01C 7/205 |
| 2018/0139894 | A1 * | 5/2018 | Jagow | A01C 5/068 |
| 2018/0249621 | A1 * | 9/2018 | Horsch | A01C 7/12 |
| 2019/0261549 | A1 * | 8/2019 | Christie | A01B 23/06 |
| 2020/0100421 | A1 * | 4/2020 | Wang | A01B 73/042 |
| 2020/0359559 | A1 * | 11/2020 | Koch | A01C 5/068 |

FOREIGN PATENT DOCUMENTS

| | | | | |
|---|---|---|---|---|
| CN | 204217392 | U | 3/2015 | |
| DE | 3616022 | A1 * | 11/1987 | A01C 7/08 |
| DE | 102010016247 | A1 | 10/2011 | |
| HU | 0002271 | A1 * | 10/2001 | A01C 7/201 |
| WO | WO-9317545 | A1 * | 9/1993 | A01C 5/068 |
| WO | WO-9424843 | A1 * | 11/1994 | A01C 7/042 |
| WO | WO-03032707 | A1 * | 4/2003 | A01B 49/06 |
| WO | WO-2017143125 | A1 * | 8/2017 | A01B 21/08 |

OTHER PUBLICATIONS

Parker Steel Company, "Metric Metals Reference Guide", 2016, p. 33-39 (Year: 2016).*

* cited by examiner

SEEDING ASSEMBLY FOR SEEDING MACHINE

FIELD OF THE INVENTION

The present invention relates to a sowing device, also called a seeding assembly, for a seed-sowing machine, especially rice, which pivots so as to perfectly copy the irregularities that the land to be sown presents in its surface and allows close spacing between furrows.

BACKGROUND OF THE INVENTION

Rice sowing is carried out on a previously prepared soil that, depending on the slope of the land, will have a greater or lesser number of levees (taipas). This sowing is currently carried out by means of rice sowing equipment that uses compression springs to transmit the load of the machine, which implies that, when the seeding machine is working on the seedbed or area between levees, the sowing is carried out correctly but when in the area of "trenches", that is, the depression before and after the levee, the spring expands too much and the seeding equipment runs out of load causing the seeds to remain outside the furrow. On the contrary, when the equipment is transiting the peak or highest point of the levee, the spring undergoes an excessive compression, transmitting a high load on the seeding equipment, causing the seeds to be buried very deep.

In addition, the rice seeding equipment currently used allows a separation between furrows ranging from 17.5 cm to 21 cm, which is excessive and implies a detriment in their yield since rice cultivars currently planted are made up of compact and closed plants, called columnar structure plants, and sowing with these distances creates a prolonged delay in closing the inter-furrow and high intra-specific competition of plants that are contiguous within the same sowing line or furrow.

There are documents in the state of the art such as U.S. Pat. No. 4,078,504 A, to John M. Tye, related to a seeding machine that has an adjustable spacing between the discs of the seeding machine, however, as described, the seeding machine does not allow spacing between furrows smaller than 17 cm.

DE 102010016247 A1, to Amazonen-Werke H. Dreyer GmbH & Co. KG, discloses a precision pneumatic seeder that has additional seed release elements that can be used to increase the placement distance of the seed grains in a row. However, as described in said document, it is not clear how said seeding machine would achieve spacing between furrows smaller than 17 cm.

Therefore, there is a need for a device that allows overcoming the above-mentioned drawbacks, being able to obtain separations between furrows smaller than those of the state of the art and work efficiently in the conditions of a seedbed, or any other, with irregular surfaces both on the paddy field and on the trench and ridge.

BRIEF DESCRIPTION OF THE INVENTION

Based on the foregoing considerations, the present invention provides a seed-sowing device or assembly, which pivots so as to perfectly copy the irregularities that the surface of the land to be planted presents and allows narrower distances between furrows, regarding what is known in the state of the art, so as to obtain higher yields in the sowing of seeds.

Accordingly, it is an object of the present invention a seed-sowing device or assembly, especially of rice, composed of at least two single seeding units arranged in parallel and displaced longitudinally from one another, which allows to achieve a narrow spacing between furrows and to be anchored to the frame of any direct sowing seeder, where each of said single seeding units comprises:
- a first support arm pivotally connected at one of its ends to the seeder frame, wherein said first support arm supports:
- a charge regulator; and
- a second support arm pivotally connected to another end of the first support arm, wherein said second arm supports:
- at least one furrow-generating disc inclined angularly with respect to a vertical direction;
- at least one depth limiting wheel coupled to the at least one furrow-generating disc;
- a seed contact wheel; and
- a third support arm pivotally connected to one end of the second support arm, wherein said third arm supports:
- two furrow-closing wheels inclined angularly with respect to each other in a vertical direction.

In a preferred embodiment of the present invention, the achieved spacing between furrows is greater than or equal to 13 cm.

In a preferred embodiment of the present invention, the first support arm is hollow, of rectangular cross-section, having a separation distance between lateral faces between 5 and 12 cm.

In an even more preferred embodiment of the present invention, the distance between the side faces of the first support arm is 7 cm.

In a preferred embodiment of the present invention, the charge regulator is a pneumatic chamber that receives the charge pressure of an air compressor.

In an even more preferred embodiment of the present invention, the second support arm supports two furrow-generating discs.

In a preferred embodiment, a soil and stubble containing skid is anchored at one end of the second support arm.

In a preferred embodiment of the present invention, the inclination angle of the at least one furrow-generating disc with respect to the vertical direction is between 5° and 10°.

In one embodiment of the present invention, the two furrow-generating discs are angularly separated horizontally between 5° and 30° from each other.

In a preferred embodiment of the present invention, the horizontal angular gap between the two furrow-generating discs is 10°.

In an even more preferred embodiment of the present invention, the horizontal angular gap between the two furrow-generating discs is 15°.

In a preferred embodiment of the present invention, the two furrow-generating discs are formed by a larger diameter disc and a smaller diameter disc whose diameter difference is 0.5 to 2 inches, preferably 1 inch.

In an even more preferred embodiment of the present invention, the smaller diameter disc is peripherally milled, internally and externally.

In a preferred embodiment of the present invention, the material of the at least one depth limiting wheel is selected from the group comprising metallic materials and polymeric materials.

In a preferred embodiment of the present invention, the at least one depth limiting wheel is of a frustoconical section, having an inclination angle of said frustoconical section equal to the vertical inclination of the at least one furrow-generating disc and it is preferably coupled to the larger diameter disc.

In an even more preferred embodiment of the present invention, the at least one depth limiting wheel is interchangeable so that different depth of sowings can be obtained, preferably between 2 and 4 cm.

In an even more preferred embodiment, between the at least one furrow-generating disc and the at least one depth limiting wheel there is a soil and stubble containing skid.

In a preferred embodiment of the present invention, contact with the seeds of the seed contact wheel is achieved by means of an expansion spring.

In a preferred embodiment of the present invention, the seed contact wheel material is selected from the group comprising metallic materials and polymeric materials, preferably polytetrafluoroethylene, commercially known as Teflon™.

In a preferred embodiment of the present invention, the inclination angle of each furrow-closing wheel with respect to the vertical direction is between 0° and 30°.

In a preferred embodiment of the present invention, the inclination angle of each furrow-closing wheel with respect to the vertical direction is 10°.

In a preferred embodiment of the present invention, the two furrow-closing wheels have a disc attached to its outer face that has a "V" recessed type or serrated configuration on its periphery.

In a preferred embodiment of the present invention, the two furrow-closing wheels are linked to a compression spring to regulate the load necessary to close the furrows.

In a preferred embodiment of the present invention, the second support arm has in its structure seed and fertilizer discharge ducts.

In a preferred embodiment of the present invention, the seed and fertilizer discharge ducts have seed and fertilizer discharge sensors, respectively.

It is another object of the present invention a seed-sowing machine comprising a frame, mobility means and a seed-sowing assembly coupled to the frame, wherein the seed-sowing assembly comprises at least two single seeding units according to the first object of the invention.

Therefore, by means of the seed-sowing assembly of the present invention, results are achieved with higher yields in rice crops by approaching the sowing lines to each other at a narrow distance. This is due to the achievement of a better parallelism in the seed spacing in the line and between the lines, with less plant competition for water and solar radiation resources, this also allows closing the inter-fiurow faster than traditional spacing, thus reducing the intra-specific competence. This reduction is due to the fact that obtaining a narrow spacing allows a greater separation of the seeds that are within the same seeding line or furrow. Additionally, a more than significant contribution is obtained to make competition more efficient with possible weeds and, in turn, to achieve a significant reduction in the use of phytosanitary products.

DETAILED DESCRIPTION OF THE INVENTION

The present invention will be described in greater detail below, with reference to the accompanying figures illustrating embodiments of the invention by way of example, which should not be construed as limiting thereof.

In each of the figures, the same numerical references are used to designate similar or equal elements of the device of the present invention.

Figure 1A:
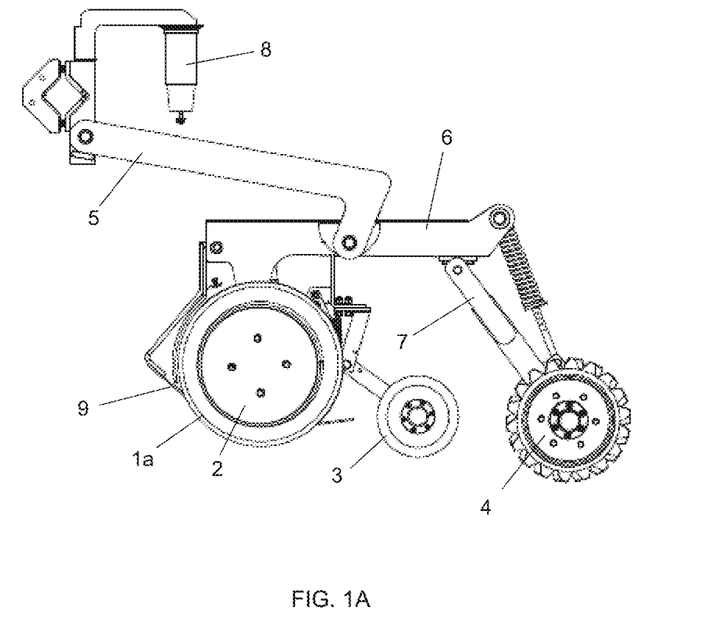
FIGS. 1A and 1B show a right side view and a left side view, respectively, of an embodiment of the single seeding unit of the present invention.
Figure 1B:
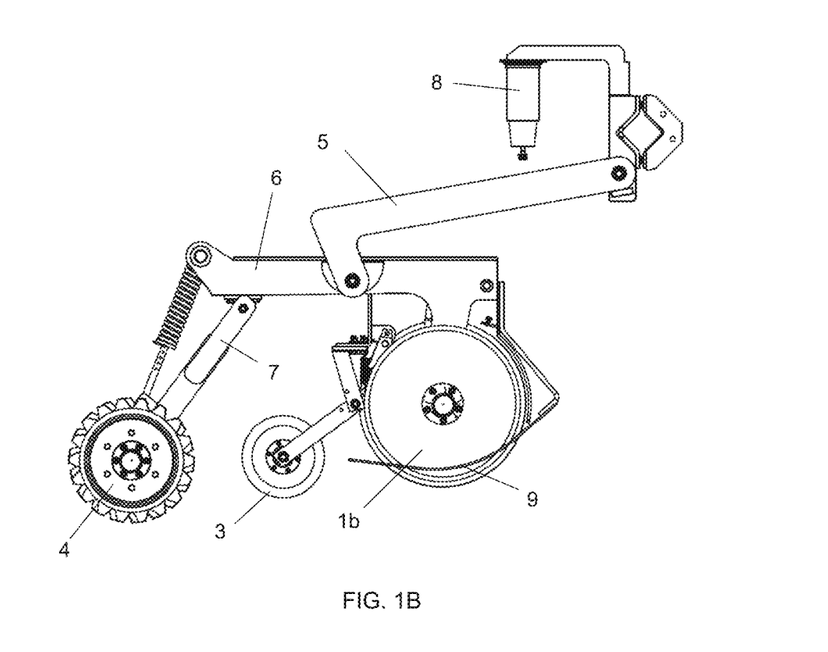

FIGS. 1A and 1B show a right side view and a left side view, respectively, of an embodiment of an single seeding unit of the seed-sowing assembly of the present invention comprising furrow-generating discs $1a$ and $1b$, a depth limiting wheel 2, a seed contact wheel 3, two furrow-closing wheels 4, a first support arm 5, a second support arm 6, a third support arm 7, a pneumatic chamber 8 and containing skids 9.

The furrow-generating discs $1a$ and $1b$ comprise 2 V-shaped discs with respect to a horizontal direction and which are preferably arranged at 15° angles from one another, and may also be between 5° and 30° as needed. In addition, said discs $1a$ and $1b$ have an inclination angle, relative to a vertical direction, which is selected from the range between 5° and 10°. The discs $1a$ and $1b$ have different diameter, for example, in preferred embodiments the disc $1a$ can be 16 inches in diameter and the disc $1b$ can be 15 inches in diameter, the one shown in FIG. 1A being the disc $1a$ of larger diameter. The disc $1b$ of smaller diameter, which is shown in FIG. 1B, may have 1 inch less in diameter than the adjacent disc $1a$, being able to have more or less difference according to need within a range of 0.5 to 2 inches. The disc $1b$ of smaller diameter has the particularity of presenting a peripheral internal milling (in addition to the conventional external milling that generates the edge of the disc), which gives the furrow-generating discs, a more intimate contact with the ground, of greater contact length and that said contact be extended significantly in time of use, compared to conventional ones (without internal milling). This also improves the quality of seeding because it prevents the entry of earth or external earth lumps, prevents blockages and prevents the early formation of furrows in the form of "W", which is generated by the separation of the discs at the first peripheral wear signs, preventing the seed from being placed in the proper position (bottom of the furrow) and making it difficult for it to access soil water optimally.

The depth limiting wheel 2 is a stamped wheel of frustoconical section or profile and has a diameter defined by the introduction depth of the seed. Said depth limiting wheel 2 is preferably metallic, although it can also be of a polymeric material, and is coupled to the outer face of the larger diameter disc 1a. In the event that the seeding assembly has to operate with a high pressure, the wheel 2 coupled to the larger diameter disc 1a can sink, so that in order to avoid the sinking a second depth limiting wheel 2 can be coupled to the face external disc 1b of smaller diameter thus obtaining a larger bearing surface and pressure reduction. The wheel 2 is centrally coupled to the disc 1a of greater diameter in order to keep the depth of sowing constant regardless of the irregularities of the land and in the case of paddy field, keep it constant regardless of whether it is circulating on the seedbed, trench or levee. It should be noted that a certain clearance of a few millimeters is left between the disc 1a of greater diameter and the depth limiting wheel 2 in order to leave a space for a skid as will be seen later in the present description.

Figure 7:
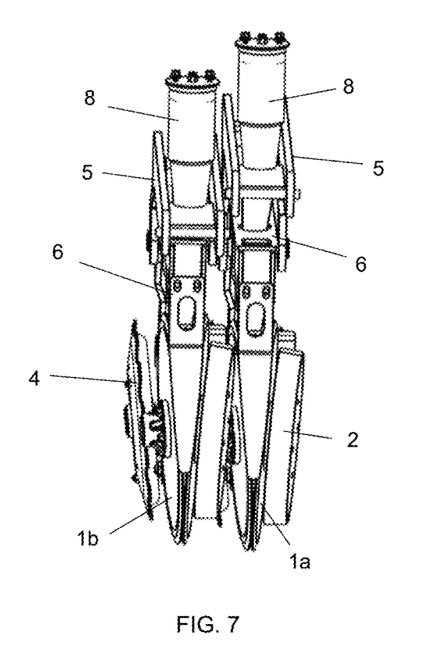
FIG. 7 shows a slightly perspective front view of the seeding assembly of FIG. 6.

The tread of the limiting wheel 2 is not of flat conformation or profile, but as previously mentioned, it presents an angulation, as seen in FIG. 7, due to the frustoconical section or profile that is counteracted by the inclination angle with respect to a vertical direction of the furrow-generating discs 1a and 1b. In this way, when the limiting wheel 2 is in the working position, the profile of its tread is supported completely parallel to the ground, perfectly distributing the load over its entire surface of contact with the ground, improving sustenance and avoiding compacting the soil against the seeding line.

To vary the depth of sowing, the depth limiting wheels 2 can be interchanged with other wheels 2 of different diameters in order to offer a different depth of sowing, for example, 2 cm, 3 cm or 4 cm deep, and its anchoring to the disc is done by means of bolting or screwing so that they are easily removable.

In the outer part of the disc 1b of smaller diameter, which does not have a depth-limiting wheel, there is, skidding thereto, a soil and stubble containing skid 9, as can be seen in FIG. 1B. Said skid 9, is anchored, at its front end, to the second support arm 6 of the seeding assembly, while, at its rear end, the skid is floating and, in working position, resting on the ground and passing at the height of the first quarter of the diameter of the disc with respect to the ground. The function of this skid 9 is to contain the soil and stubble, preventing them from being lifted by the friction of the disc 1b. In addition, the contact of the skid 9 with the disc 1b generates a cleaning effect on the external face of the disc, removing the earth that could be adhered. This is a very important function when the soil has a high clay content or high humidity preventing the soil from sticking on the furrow generator disc 1b. This skid 9 in turn improves the effect of stubble cutting on the ground preventing stubble from being introduced into the furrow.

On the other disc, the disc 1a of greater diameter which does have a depth limiting wheel 2 coupled to the center thereof, another containing skid (not shown) is emerging from the hub of the disc 1a, between the disc 1a and the limiting wheel 2, by means of a clearance of approximately 4 millimeters, this skid having the same function as the previous one, but in this case, of shorter length and anchored to the hub.

The seed contact wheel 3 is a wheel preferably of 4 inches in diameter and ½ inch wide, and may be larger or smaller according to need. It is preferably constructed of polytetrafluoroethylene commercially known as Teflon™, although it may be of another polymeric or metallic material as needed. Polytetrafluoroethylene does not uptake the high moisture of the soil and, therefore, prevents the seed from sticking to the wheel and from moving or removing the seed from the furrow. The load or ballast of the wheel is exerted by means of an expansion spring whose load is calculated to provide the best contact of the rice seed with the bottom of the seed furrow and thus facilitate the processes of water capillarity and, therefore, improve the contact of the seed with water. This spring can be exchanged for another of greater or lesser load depending on the need for soil or seeds.

The two furrow-closing wheels 4 are composed of 2 wheels of preferably 10 inches in diameter, preferably arranged at 10° angle of a vertical line between them, being able to be of greater or lesser angle according to need within a range of 0° to 30°. This exclusive angulation allows obtaining an effective cover both on the seedbed and on the trench and crest of the levee. Also, the furrow-closing wheels 4 have a horizontal angulation with each other, as necessary. The tread of the wheels 4 is of the semicircle type (it can be of the trapezoidal type as needed) that provides the best load transfer to the ground in the furrow walls. These wheels 4 close the furrows by applying pressure, its operation being easier if the ground is wet. On the other hand, if the floor is dry, external discs can be attached to their outer face.

Said discs can be of different diameters, preferably 12 inches, and can be anchored to the wheels 4 by means of screws or bolts that allow their rapid removal as needed. These discs have on their periphery a cut of a "V" recessed type. These cut-outs, of 1 inch projection above the closing wheels 4, allow a small carving and clogging of loose soil on the furrow to achieve an efficient closure. The "V" recessed type configuration is less aggressive avoiding the problems of mismatching or movement of seeds generated by a "jagged" or "serrated" type. Both cut-out discs can be extracted when sowing with high soil moisture to avoid jamming. The closing wheels 4 are supported by the third support arm 7 whose upper end is pivotally connected to the second support arm 6 thus conferring to the wheels 4 an excellent ground irregularities copying without losing the ability to close or cover efficiently the seed furrow. In addition, they have the possibility of varying the load thanks to an adjustable compression spring that works on an axis with perforations that function as a register to lock the compression spring support to the indicated position.

The second support arm 6 supports the furrow-generating discs 1a and 1b, the depth limiting wheel 2, the seed contact wheel 3 and the third support arm 7, the latter being, as mentioned above, pivotally connected to the second support arm 6. The second support arm 6 is pivotally connected to the first support arm 5 by a pivot point that is approximately in the center of the second support arm 6.

The first support arm 5 supports the pneumatic chamber 8 and the second support arm 6, the latter pivotally connecting to said first support arm 5. This connection occurs through one of the ends of the first support arm 5 while at the other end it is connected to the frame of any direct sowing seeder, both of the air-drill configuration and of conventional structure.

The pneumatic chamber 8 is the element used for the transfer of load from the seeder frame to the seeding assemblies, a load that will remain constant thanks to the frustoconical design of a rod that is part of the pneumatic chamber used.

In this way, a triple pivot configuration is achieved on the seeding assembly that allows each of the active components of the seeding assembly to work efficiently either in a seedbed or in any other field presenting irregular surfaces. In this way each of the assembly components works in the same way both on the paddy field and on the trench and crest of the levee. That is, through this configuration, the natural or anthropic irregularities that the soil presents on its surface are perfectly copied.

The single seeding unit of FIGS. 1A and 1B of the seed-sowing assembly of the present invention is further capable of incorporating stubble cutting blades (not shown) with a configuration of at least 13 cm between blades and with the capacity to keep the depth of work constant and copy the irregularities of the terrain thanks to a band limiter.

Figure 2:
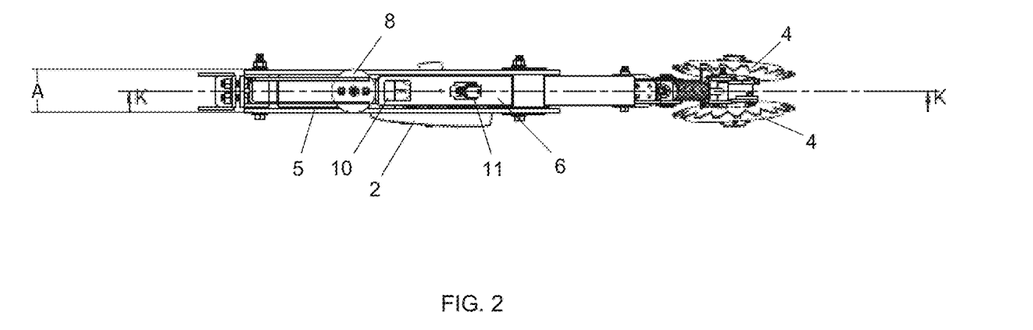
FIG. 2 shows a top view of the embodiment of the single seeding unit of FIGS. 1A and 1B.

FIG. 2 shows a top view of the embodiment of the single seeding unit of FIGS. 1A and 1B, where in addition to the aforementioned components, the fertilizer discharge conduit 10, the seed discharge conduit 11 and the separation A between the lateral faces of the first support arm 5 can be further appreciated.

The seed drop from the dispensers (not shown) to the ducts 11 for discharging seeds is preferably carried out by at least one telescopic tube (not shown) of four sections with flexible sleeves at their ends. This allows the fluid and constant fall of the seeds without generating spurting sowing. The first support arm 5 is hollow which allows the telescopic tubes to cross therethrough without bending or throttles. Additionally, the drop to these ducts can be done by means of corrugated hoses with internal skirts and internal tensioning rubber probe to avoid the formation of acute angles. Both the telescopic tubes and the corrugated hoses discharge the seeds in said seed discharge duct 11, which has a small curvature that reduces the rebound effect of the seed on it. Additionally, said duct 11 may have seed discharge sensors that allow sensing the number, quantity or dose of seeds and fertilizer, per unit of time and area. It should be noted that said telescopic tubes and hoses can also be used for the discharge of fertilizers through the fertilizer discharge duct 10.

The separation distance A between the side faces of the first support arm 5 is preferably 7 cm, although said separation may be greater or lesser as needed within a range of 5 to 12 cm. This separation allows, as mentioned above, to circulate between said first support arm 5 faces the telescopic hoses or tubes for discharging seeds and fertilizers in an upright position and avoiding problems of folds of the discharge elements.

Figure 3:
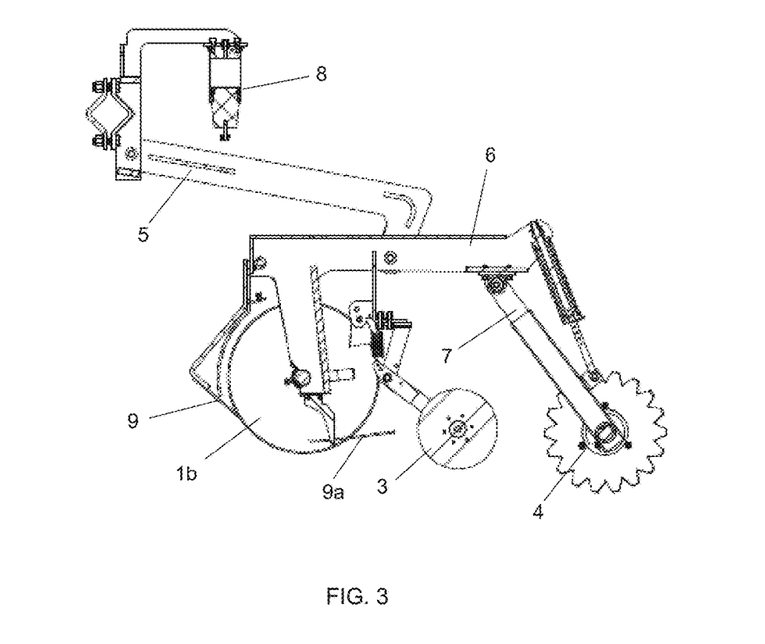
FIG. 3 shows the longitudinal cut K-K of the single seeding unit of FIG. 2.

FIG. 3 shows the longitudinal cut K-K of the single seeding unit of FIG. 2 where a skid 9a of shorter length can be seen.

Figure 4:
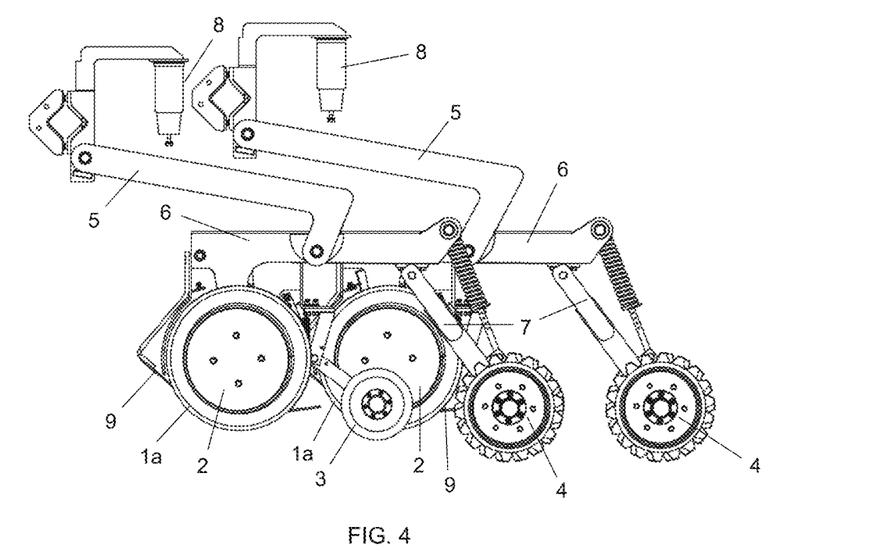
FIG. 4 shows a right side view of the seeding assembly of the present invention comprised of two single seeding units of FIGS. 1A and 1B.

FIG. 4 shows a right side view of the seed-sowing assembly of the present invention composed of two single seeding units of FIGS. 1A and 1B arranged in parallel and longitudinally displaced from each other. In said configuration, the pneumatic chambers 8 receive the loading pressure of an air compressor (not shown) that may or may not be incorporated into the seeding assembly. Each of these pneumatic chambers 8 is jointly connected to, and whose pressure peaks (negative and positive) are absorbed by, a common reservoir (not shown) of buffer characteristic. The load transfer system used gives each single seeding unit greater stability in uneven terrain since it does not offer an oscillatory response. Once the seeder operator regulates the load of the chambers 8, depending on the soil conditions, the chamber 8 has the feature, unlike commonly used springs, of maintaining the load constantly regardless of the circulation of the seeding assembly on the seedbed, the trench or the crest of levee. This is a condition of great relevance in the rice sowing, or general planting with irregular ground, since it allows to keep the depth of sowing constant without compacting the side walls of the seeding line.

Figure 5:
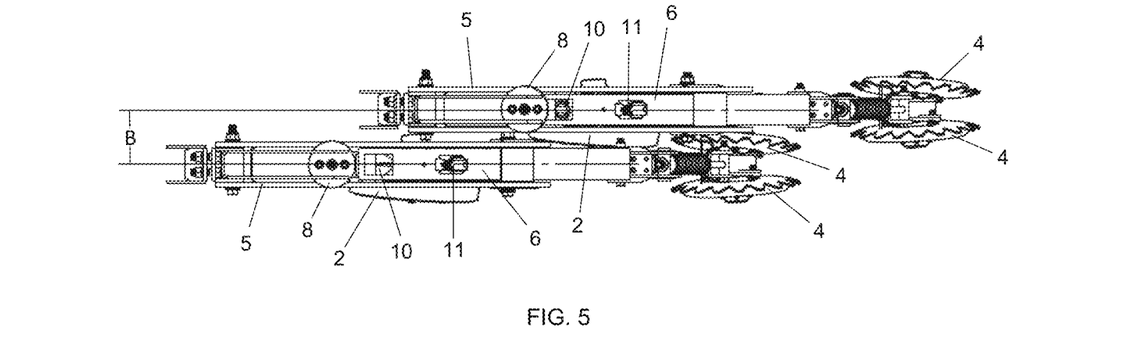
FIG. 5 shows a top view of the seeding assembly of FIG. 4.

FIG. 5 shows a top view of the seeding assembly of FIG. 4 where it can be seen, in addition to the components mentioned above, the separation B between said units, which determines the distance between furrow lines. Said separation distance can be, as a lower limit, up to 13 cm in length, which is a distance between furrow lines more optimal than those available with other seeding devices of the current state of the art.

Figure 6:
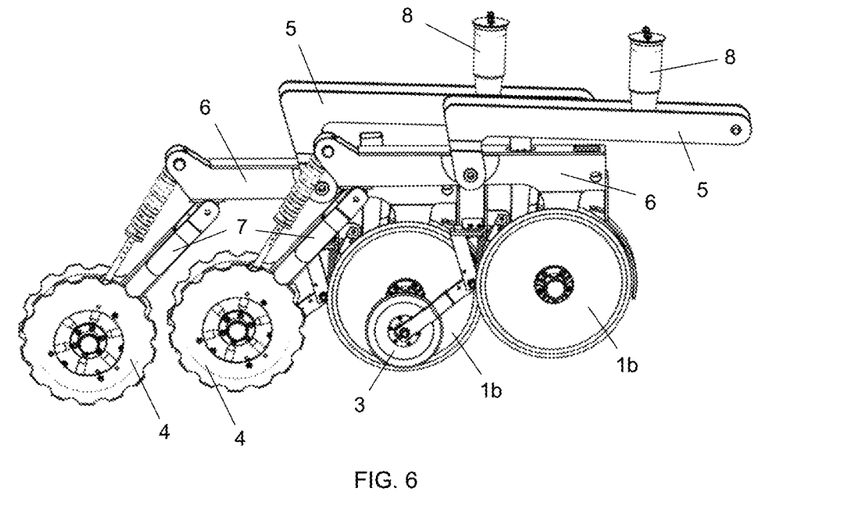
FIG. 6 shows a slightly perspective left side view of the seeding assembly of the present invention comprised of two single seeding units according to another embodiment.

Referring now to FIG. 6, there can be seen a slightly perspective left side view of the seeding assembly of the present invention composed of two single seeding units according to another embodiment. In said other embodiment, the pneumatic chamber 8 has differences in relation to its connection with the first support arm 5, being closer to it, compared to the embodiment of the single seeding unit described in the previous Figures.

Figure 8:
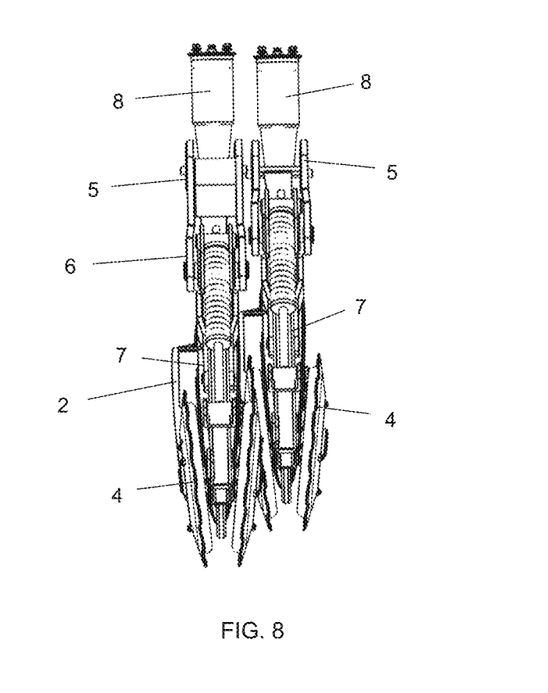
FIG. 8 shows a rear view of the seeding assembly of FIG. 6.

FIGS. 7 and 8 show a slightly perspective front view and a rear view, respectively, of the seeding assembly of FIG. 6. In said FIG. 7, it can be seen that the furrow-generating discs 1a and 1b are inclined with respect to a vertical direction at an inclination angle between 5° and 10°, as previously described. Likewise, it can be seen that the two furrow-closing wheels 4 are also inclined with respect to a vertical direction at an angle of preferably 10°, which may be of greater or lesser angle as needed within a range of 0° to 30°, as described previously.

Figure 9:
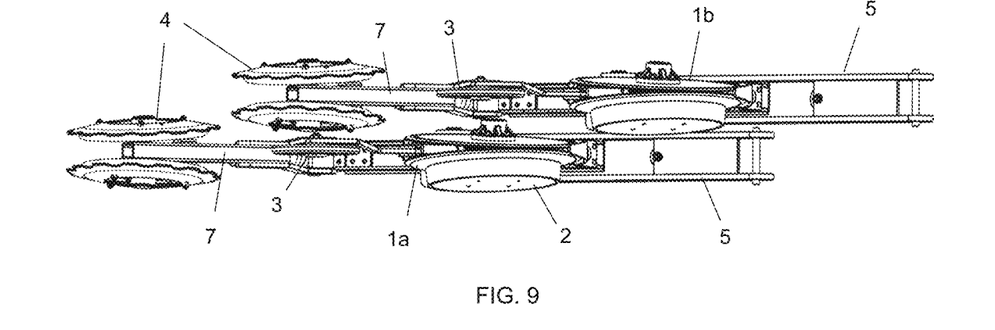
FIG. 9 shows a bottom view of the seeding assembly of FIG. 6.
Figure 10:
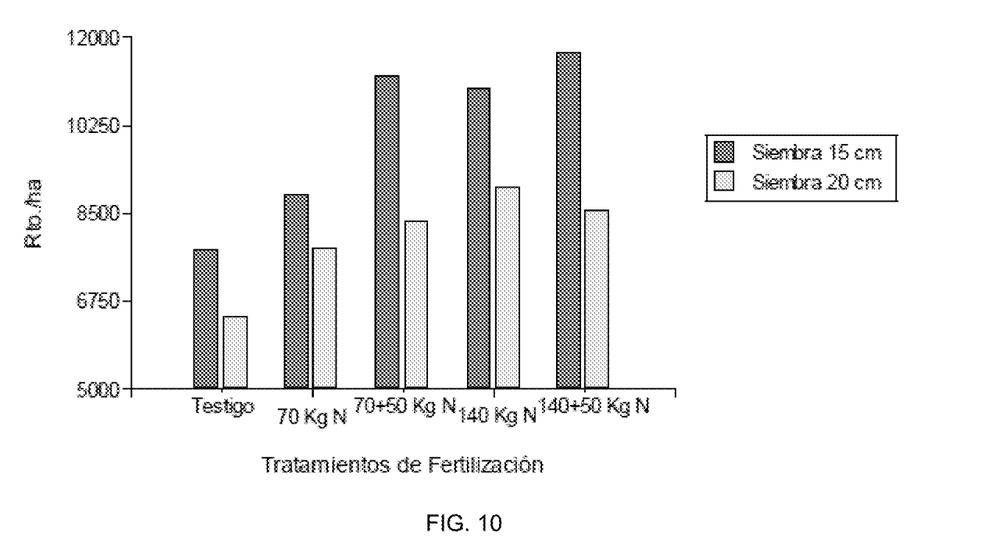
FIG. 10 shows a comparative graph between the grain yield of a conventional seeding performed with spacing between furrows of 20 cm and a seeding performed with spacing between furrows of 15 cm by means of the seeding assembly of the present invention.

Finally, FIG. 9 shows a bottom view of the seeding assembly of FIG. 6, in which it can be seen how the furrow-generating discs 1a and 1b and the furrow-closing wheels 4 present an angulation with respect to one direction horizontal as previously described.

Experimental Tests

Tests were conducted whose results show yields of 28 to 34% higher in rice crops by approaching the sowing lines at a distance of 13 cm. This is due to the effect generated by achieving a better parallelism in the spacing of seed in the line and between the lines, with less competition for water and solar radiation resources, also allowing the closure of the inter-furrow 50% faster than the traditional spacing method, which is a more than significant contribution to efficient competition with possible weeds and therefore to achieve a significant reduction in the use of phytosanitary products.

In another test, the rice crop yield (grain yield) was compared between a first rice seed sowing system in rows or furrows by a conventional seeder and a second rice seed sowing system in rows through the seeding assembly of the present invention in fields between the towns of Las Palmas and La Leonesa in the province of Chaco, Argentina .

In particular, the first sowing system consisted of sowing 1 ha (hectare) with rows separated from each other by 20 cm (conventional spacing) and the second sowing system consisted of sowing 1 ha with rows separated from each other by 13 cm.

Seed density per hectare in both crops was 110 kg/ha. To complement the study of the sowing systems, four fertilizing levels were established in each sowing system by applying urea in pre-irrigation in different doses. The urea doses used were 0 kg/ha; 80 kg/ha; 160 kg/ha and 240 kg/ha.

For weed control, Pendimentalin (Herbadox H20) was applied at a rate of 3.5 l/ha of pre-emergency commercial product. In pre-irrigation, Aura was applied at a dose of 1 l/ha as a post-emergent treatment.

The entire test was fertilized with 90 kg/ha of urea at the time of differentiation of floral primordium. The emergence of the crop was recorded two days later. The beginning of the irrigation was carried out 40 days after the emergence of the crop, from that moment it was given constant film of water until the end of the cycle. The harvest was carried out when the grain moisture was approximately 15%, it was carried out with an experimental harvester; two plots of 400 m² were harvested per treatment in both sowing systems. The yield data were analyzed using an analysis of variance.

The crop showed a good development in both sowing systems, observing 40 days after the emergency, a greater coverage in the plots corresponding to the second sowing system with rows separated from each other by 13 cm. The rice plants of the second sowing system, according to the present invention, showed homogenous sized tillers, similar to the main stems and larger panicles. No fertilization-spacing interaction was found and the visual differences observed were reflected in yields where the second sowing system clearly exceeded the first sowing system. The distribution allowed yield increases of 48% on average of all fertilization treatments evaluated, that is, through the first sowing system, a yield of 6557.4 kg/ha was obtained, while with the second sowing system with rows separated from each other by 13 cm, a yield of 9761.3 kg/ha was obtained. Fertilization treatment showed differences with the control (without fertilizers), although they hardly differed between them.

Table 1 below shows the results of this test can be seen. To compare the different treatments in this trial, the Tukey Test was used, which indicates with letters the significant differences between treatments. Treatments with equal letters, indicates that they do not differ statistically.

TABLE 1

|  | Yield (kg · ha$^{-1}$) |
|---|---|
| Spacing | |
| Seeding spacing 20 | 6557.4 b |
| Seeding spacing 13 | 9761.3 a |
| Fertilization | |
| 0 kg · ha$^{-1}$ | 7400.3 b |
| 80 kg · ha$^{-1}$ | 8112.0 ab |
| 160 kg · ha$^{-1}$ | 8257.5 ab |
| 240 kg · ha$^{-1}$ | 8867.5 a |
| CV % | 3.6 |

Equal letters do not differ significantly.
Tukey test p < 0.005.

The results of this test demonstrate that a better distribution of plants is important to increase yield with this plant ideotype. The second sowing system indicates a better use of light and mineral resources contributing to a more sustainable system. Likewise, the results of this trial showed that the approach between rows, that is, moving from a conventional spacing between rows of 20 cm to a spacing between rows of 13 cm, had no statistically significant differences with the highest dose of fertilizer. Therefore, just by approaching rows, a response in grain yield equal to or greater than that obtained by applying the highest dose of fertilizer is achieved.

Table 1 also shows the coefficient of variation (CV) which indicates how much the values of each treatment, as a percentage, moved away from the average. It is a coefficient that indicates the uniformity or non-uniformity of a population. In this case, the CV is very small (3.6%), which indicates that the population was very uniform.

Finally, a test was carried out in the experimental station of the National Institute of Agricultural Technology (INTA) of Concepcion del Uruguay, Argentina, where the selected lot was tilled in a conventional manner.

Prior to sowing, a base fertilization of 120 kg/ha of potassium chloride and 105 kg/ha of diammonium phosphate (18-46-0) was applied.

The sowing of rice seeds was carried out at the beginning of the spring under two distribution systems, a first system with spacing between rows of 20 cm carried out by means of a traditional seeding assembly and a second 15 cm row spacing system made with the seeding assembly of the present invention. Seed density per hectare was 97 kg/ha, maintaining the same density in both systems.

The fertilization treatments carried out were: T1, without nitrogen addition; T2, 70 kg/ha of nitrogen (pre-irrigation); T3, 70 kg/ha of nitrogen (pre-irrigation)+50 kg/ha of nitrogen (differentiation); T4, 140 kg/ha of nitrogen (pre-irrigation) and T5, 140 kg/ha of nitrogen (pre-irrigation)+50 kg/ha of nitrogen (differentiation). Pre-irrigation fertilization treatments were carried out in mid-spring starting irrigation the next day, while differentiation treatments were applied in late spring. Irrigation management was under permanent flooding to minimize possible losses of nitrogen in the form of nitrous oxide ($N_2O$) that occur in flood conditions interrupted by rainfed periods.

The trial design was randomized in complete blocks with four repetitions. Plots of 2 m² were manually harvested and the yield, number of panicles, thousand grain weight and industry quality parameters were evaluated. The data obtained from each variable were subjected to an analysis of the variance.

At 25 days after sowing, the count of plants achieved in both distribution systems was performed. The plant values achieved were not statistically differentiated (see Table 2) and correspond to an implantation efficiency of 90%.

The evolution of the crop was normal, showing differences in growth (higher biomass production) due to fertilization treatments. The average yield of the test was 9053 kg/ha, a value that is good considering the low radiation and the low temperatures that were recorded during the critical period of the crop. The interaction of the factors spacing by fertilization was not significant, that is, both distance treatments responded in a similar way to the treatments (see FIG. 6). This indicates that the difference in yield obtained in favor of a spacing of 15 cm (2081 kg/ha more than 20 cm, see Table 2) is due to a greater use of the radiation resource given by the improvement in the spatial arrangement of the crop. The control fertilization treatment and 70 kg/ha achieved the lowest yields, 7097 and 8324 kg/ha, respectively, statistically differentiating themselves from the rest of the treatments. The application of 140 kg/ha of nitrogen in pre-irrigation (T4) did not differ statistically in yield of treatments T3 and T5 where nitrogen applications were partitioned in pre-irrigation and differentiation. Among the variables of the yield component, the number of panicles per area unit is the one that mostly explains the yield difference in favor of the narrowest spacing. Although in the number of panicles, both spacing do not differ statistically, the numerical difference impacts the yield (see Table 2).

TABLE 2

|  | Achieved plants/m$^2$ | Yield (kg/ha) | Panicles/m$^2$ | PMG (g) | grains/panicle |
|---|---|---|---|---|---|
| SPACING |  |  |  |  |  |
| 15 cm | 373 a | 10093 a | 500 a | 24.53 a | 104 a |
| 20 cm | 370 a | 8012 b | 460 a | 24.34 a | 100 a |
| FERTILIZATION | — |  |  |  |  |
| T1 = Control | — | 7097 b | 412 b | 24.62 a | 91 b |
| T2 = 70 kg N | — | 8324 b | 484 ab | 24.64 a | 96 ab |
| T3 = 70 kg + 50 kg N | — | 9764 a | 486 ab | 24.35 a | 105 ab |
| T4 = 140 kg N | — | 9969 a | 493 ab | 24.43 a | 108 a |
| T5 = 140 kg + 50 kg N | — | 10107 a | 524 a | 24.14 a | 111 a |
| Interaction | — | NS | NS | NS |  |

Equal letters do not differ significantly.
Tukey test p < 0.005.
NS: Not significant.

Table 3 shows the industrial quality indicators. The percentage variables of whole and total grain are not statistically differentiated for the spacing factor. However, in the 15 cm distribution, lower and statistically different percentage values of chalkiness and white belly grain were registered with respect to the 20 cm distribution. This behavior makes it possible to consider that under a system of narrowing the furrow at 15 cm between rows, the values of whole and total grain are not compromised, and the values of chalkiness and white belly grain are favored.

With regard to fertilization treatments, the application of 140+50 kg/ha of nitrogen (T5) allowed a higher percentage of whole grains to be obtained, differing from the rest of the treatments (see Table 3). On the other hand, the values of chalkiness and white belly grain obtained in the treatments with nitrogen (T2, T3, T4 and T5), differ statistically to the control treatment (without application of nitrogen, T1). This suggests that the addition of nitrogen allows reducing the values of chalkiness and white belly grain.

TABLE 3

|  | Whole grain (%) | Total (%) | * Chalkiness (%) | ** White belly grain (%) |
|---|---|---|---|---|
| SPACING |  |  |  |  |
| 15 cm | 65.94 a | 69.18 a | 0.70 a | 3.21 a |
| 20 cm | 65.21 a | 69.08 a | 1.19 b | 4.77 b |
| FERTILIZATION |  |  |  |  |
| T1 = Control | 63.29 c | 68.51 c | 1.76 b | 6.20 b |
| T2 = 70 kg N | 65.68 b | 69.27 ab | 0.73 a | 3.84 a |
| T3 = 70 kg + 50 kg N | 65.56 b | 69.17 b | 0.93 a | 3.59 a |
| T4 = 140 kg N | 65.81 b | 69.19 b | 0.65 a | 3.48 a |
| T5 = 140 kg + 50 kg N | 67.54 b | 69.54 a | 0.65 a | 2.85 a |
| Interaction | NS | NS | NS | NS |

Equal letters do not differ significantly.
Tukey test p < 0.005.
NS: Not significant.

Under the conditions given in the trial, the sown seeds responded to inter-furrow narrowing by increasing yield. This increase is explained by an increase in the number of panicles per unit area achieved in this system. The decrease in the distance between rows did not compromise the values of whole and total grain, and favored the values of chalkiness and white belly grain. Fertilization treatments increased yields in the variety. The dose of 140 kg/ha of nitrogen (T4) in pre-irrigation did not differ in yield of treatments with partitioned application (T3 and T5). This is of great importance when evaluating fertilization management practices economically. Nitrogen fertilization reduced the values of gypsum grain chalkiness and white belly grain.

Those skilled in the art will recognize or determine, using only routine experimentation, many equivalents of the specific procedures, embodiments, claims and examples described herein. Such equivalents are considered as within the scope of the present invention and covered by the appended claims. The invention was illustrated through preferred embodiments, which should not be considered as limiting the scope of the present invention.

The invention claimed is:

1. A seed-sowing assembly comprising at least two single seeding units arranged in parallel and displaced longitudinally from one another, which allows to achieve a narrow spacing between furrows and to be anchored to a frame of any direct sowing seeder, wherein each of said single seeding units comprises:
   a first support arm pivotally connected at one of its ends to the seeder frame, wherein said first support arm supports:
      a charge regulator; and
      a second support arm pivotally connected to another end of the first support arm, wherein said second support arm supports:
         two furrow-generating discs inclined angularly with respect to a vertical direction, wherein the two furrow-generating discs are formed by a larger diameter disc and a smaller diameter disc whose diameter difference is 0.5 to 2 inches, wherein the smaller diameter disc is internally and externally peripherally milled, and wherein at least one of the two furrow-generating discs is coupled to a respective depth limiting wheel;
         a seed contact wheel; and
         a third support arm pivotally connected to one end of the second support arm, wherein said third support arm supports:
            two furrow-closing wheels inclined angularly with respect to each other in the vertical direction,
   wherein the at least two single seeding units are transversely spaced apart between 13 and 17 cm from each other, wherein the first support arm is pivotally connected to the seeder frame by means of a first revolute joint, the second support arm is pivotally connected to the first support arm by m eans of a second revolute joint, and the third support arm is pivotally connected to the second support arm by means of a third revolute joint, and wherein the first revolute joint, the second revolute joint and the third revolute joint define a first transverse horizontal rotation axis, a second transverse horizontal rotation axis, and a third transverse horizontal rotation axis, respectively, allowing the first support arm to rotate clockwise or counterclockwise relative to the first transverse horizontal rotation axis, the second support arm to rotate clockwise or counterclockwise relative to the second transverse horizontal rotation axis and the third support arm to rotate clockwise or counterclockwise relative to the third transverse horizontal rotation axis, thereby said revolute joints allowing each single seeding unit to have a triple pivot configuration where the first support arm, the second support arm and the third support arm rotate clockwise or counterclockwise as the corresponding single seeding unit and copy copies natural or anthropic irregularities of soil surface.

2. The seed-sowing assembly according to claim 1, wherein the first support arm is hollow, has a rectangular cross-section, and has a separation distance between lateral faces between 5 and 12 cm.

3. The seed-sowing assembly according to claim 2, wherein the distance between the lateral faces of the first support arm is 7 cm.

4. The seed-sowing assembly according to claim 1, wherein the charge regulator is a pneumatic chamber that receives a charge pressure of an air compressor.

5. The seed-sowing assembly according to claim 1, wherein a soil and stubble containing skid is anchored at one end of the second support arm.

6. The seed-sowing assembly according to claim 1, wherein each of the two furrow-generating discs has an inclination angle between 5° and 10° with respect to the vertical direction.

7. The seed-sowing assembly according to claim 1, wherein the two furrow-generating discs are angularly separated horizontally between 5° and 30° from each other.

8. The seed-sowing assembly according to claim 7, wherein the horizontal angular separation is 10°.

9. The seed-sowing assembly according to claim 7, wherein the horizontal angular separation is15°.

10. The seed-sowing assembly according to claim 1, wherein the difference in diameter between the larger diameter disc and the smaller diameter disc is 1 inch.

11. The seed-sowing assembly according to claim 1, wherein the material of the depth limiting wheel is selected from the group consisting of metallic materials and polymeric materials.

12. The seed-sowing assembly according to claim 1, wherein the depth limiting wheel is of a frustoconical section, having an inclination angle of said frustoconical section equal to the inclination with respect to the vertical direction of the respective furrow-generating disc.

13. The seed-sowing assembly according to claim 1, wherein the depth limiting wheel is interchangeable so that different depths of sowing between 2 and 4 cm can be obtained.

14. The seed-sowing assembly according to claim 1, wherein two soil and stubble containing skids are each located between a respective furrow-generating disc and a respective depth limiting wheel.

15. The seed-sowing assembly according to claim 1, wherein the seed contact wheel contacts seeds by means of an expansion spring.

16. The seed-sowing assembly according to claim 1, wherein the seed contact wheel material is selected from the group consisting of metallic materials and polymeric materials.

17. The seed-sowing assembly according to claim 1, wherein each furrow-closing wheel has an inclination angle between 0° and 30° with respect to the vertical direction.

18. The seed-sowing assembly according to claim 17, wherein the inclination angle of each furrow-closing wheel with respect to the vertical direction is 10°.

19. The seed-sowing assembly according to claim 1, wherein each of the two furrow-closing wheels has a disc coupled on its outer face having a "V" recessed type or serrated configuration on its periphery.

20. The seed-sowing assembly according to claim 1, wherein the two furrow-closing wheels are connected to a compression spring to regulate the load necessary to close the furrows.

21. The seed-sowing assembly according to claim 1, wherein the second support arm has in its structure respective discharge ducts for seeds and fertilizers.

22. The seed-sowing assembly according to claim 21, wherein the seed and fertilizer discharge ducts have seed and fertilizer discharge sensors, respectively.

23. A seed-sowing machine comprising a frame, mobility means and a seed-sowing assembly coupled to the frame, wherein the seed-sowing assembly comprises at least two single seeding units arranged in parallel and longitudinally displaced from one another, which allows achieving a narrow separation between furrows, wherein each of said single seeding units comprises:

a first support arm pivotally connected at one of its ends to the seeder frame, wherein said first support arm supports:

a charge regulator; and a second support arm pivotally connected to another end of the first support arm, wherein said second support arm supports:

two furrow-generating discs inclined angularly with respect to a vertical direction, wherein the two furrow-generating discs are formed by a larger diameter disc and a smaller diameter disc whose diameter difference is 0.5 to 2 inches, wherein the smaller diameter disc is internally and externally peripherally milled, and wherein at least one of the two furrow-generating discs is coupled to a respective depth limiting wheel;

a seed contact wheel; and a third support arm pivotally connected to one end of the second support arm, wherein said third support arm supports:

two furrow-closing wheels inclined angularly with respect to each other in the vertical direction, wherein the at least two single seeding units are transversely spaced apart between 13 and 17 cm from each other, wherein the first support arm is pivotally connected to the seeder frame by means of a first revolute joint, the second support arm is pivotally connected to the first support arm by means of a second revolute joint, and the third support arm is pivotally connected to the second support arm by means of a third revolute joint, and wherein the first revolute joint, the second revolute joint and the third revolute joint define a first transverse horizontal rotation axis, a second transverse horizontal rotation axis, and a third transverse horizontal rotation axis, respectively, allowing the first support arm to rotate clockwise or counterclockwise relative to the first transverse horizontal rotation axis, the second support arm to rotate clockwise or counterclockwise relative to the second transverse horizontal rotation axis and the third support arm to rotate clockwise or counterclockwise relative to the third transverse horizontal rotation axis, thereby said revolute joints allowing each single seeding unit to have a triple pivot configuration where the first support arm, the second support arm and the third support arm rotate clockwise or counterclockwise as the corresponding single seeding unit and copies natural or anthropic irregularities of soil surface.

* * * * *